Aug. 14, 1923.
G. W. WOODWARD
AUTOMATIC CONTROL MECHANISM
Filed Jan. 20, 1920
1,464,962
10 Sheets-Sheet 4
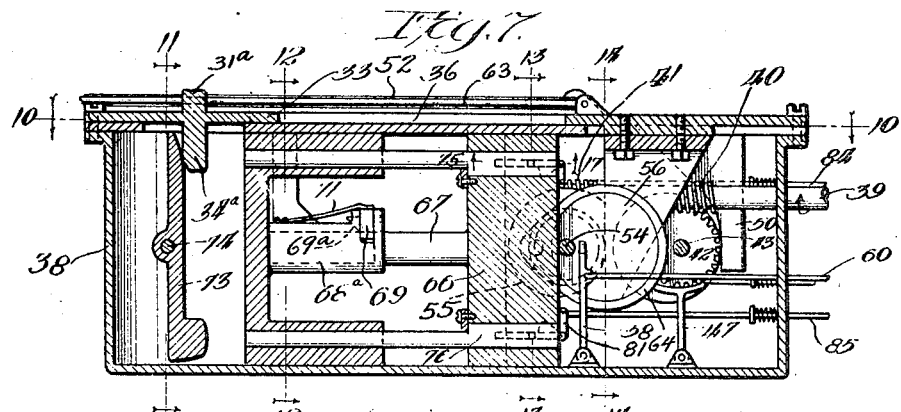
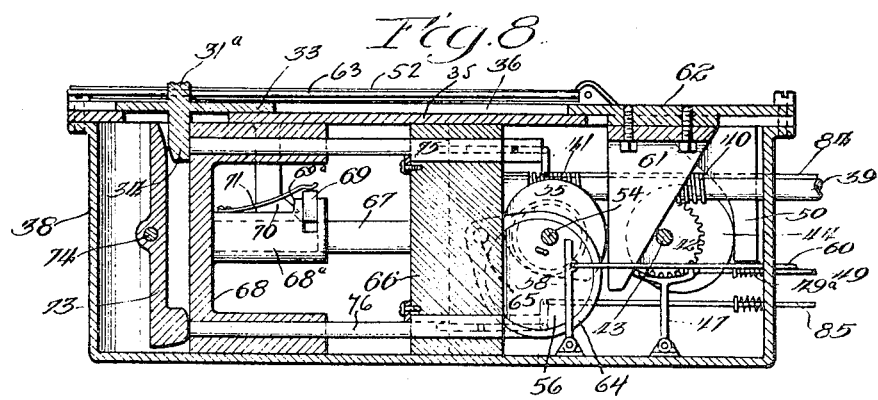
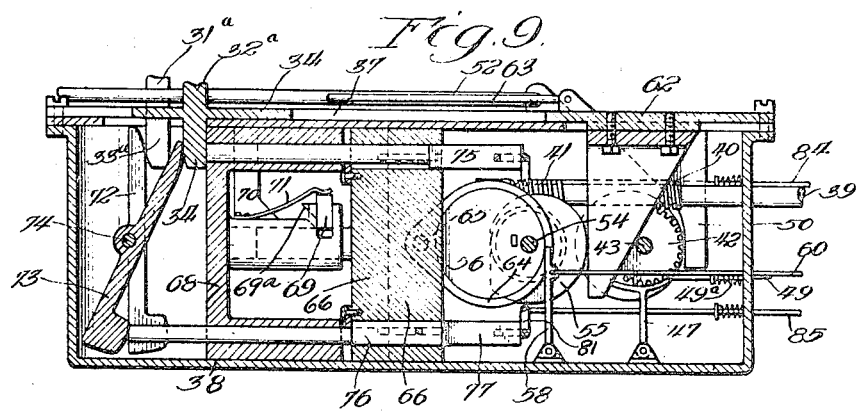
Inventor:
Garrett W. Woodward

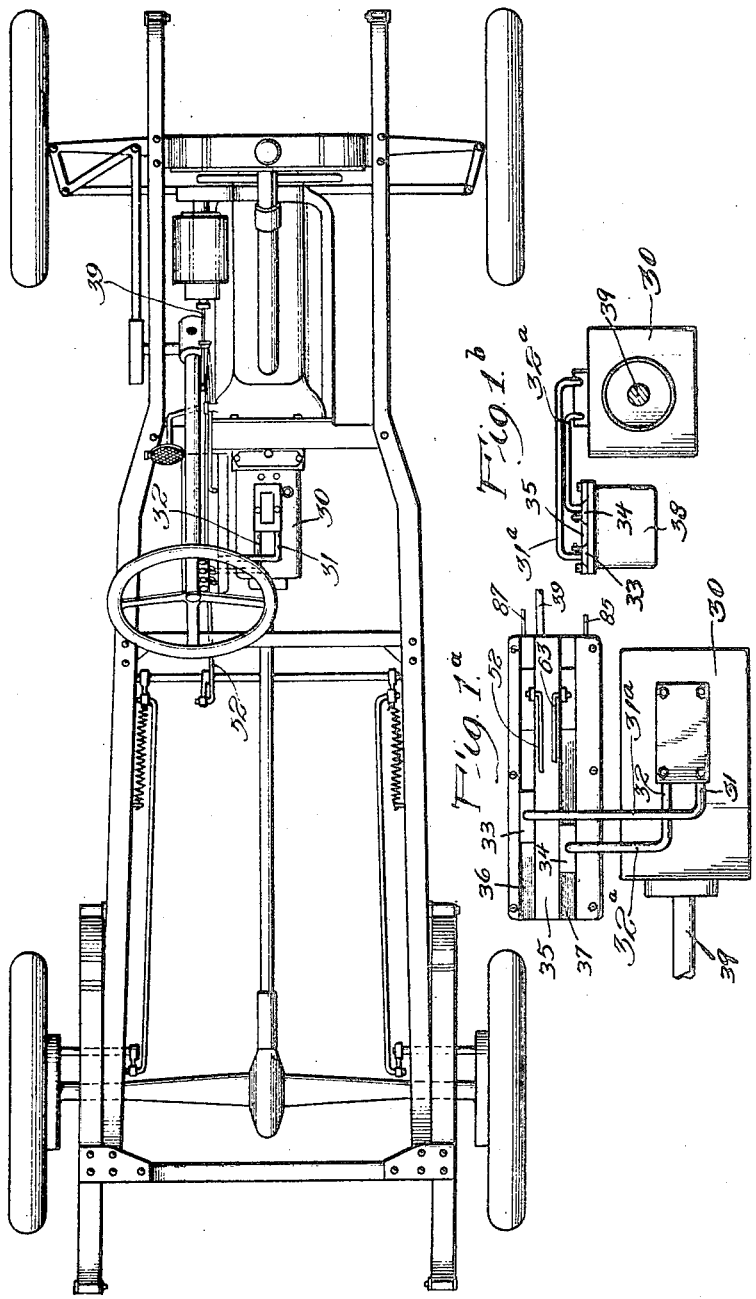

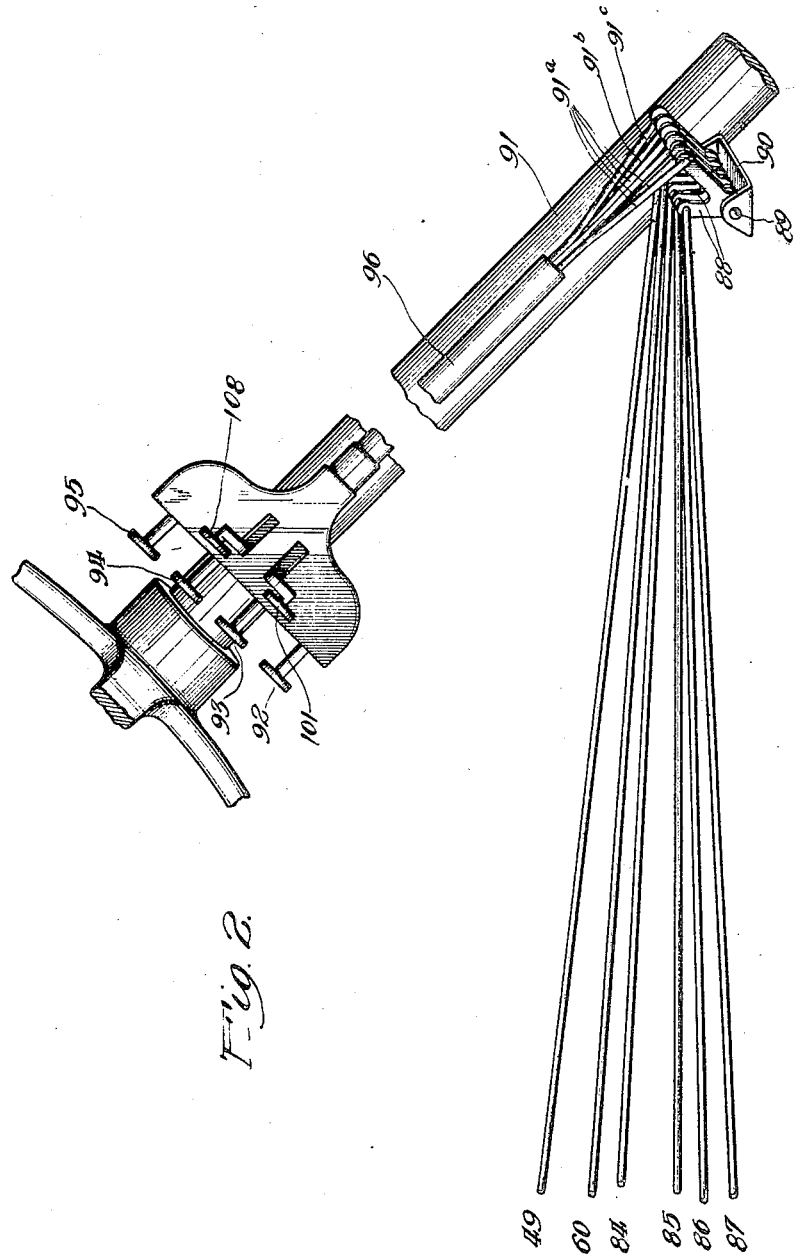

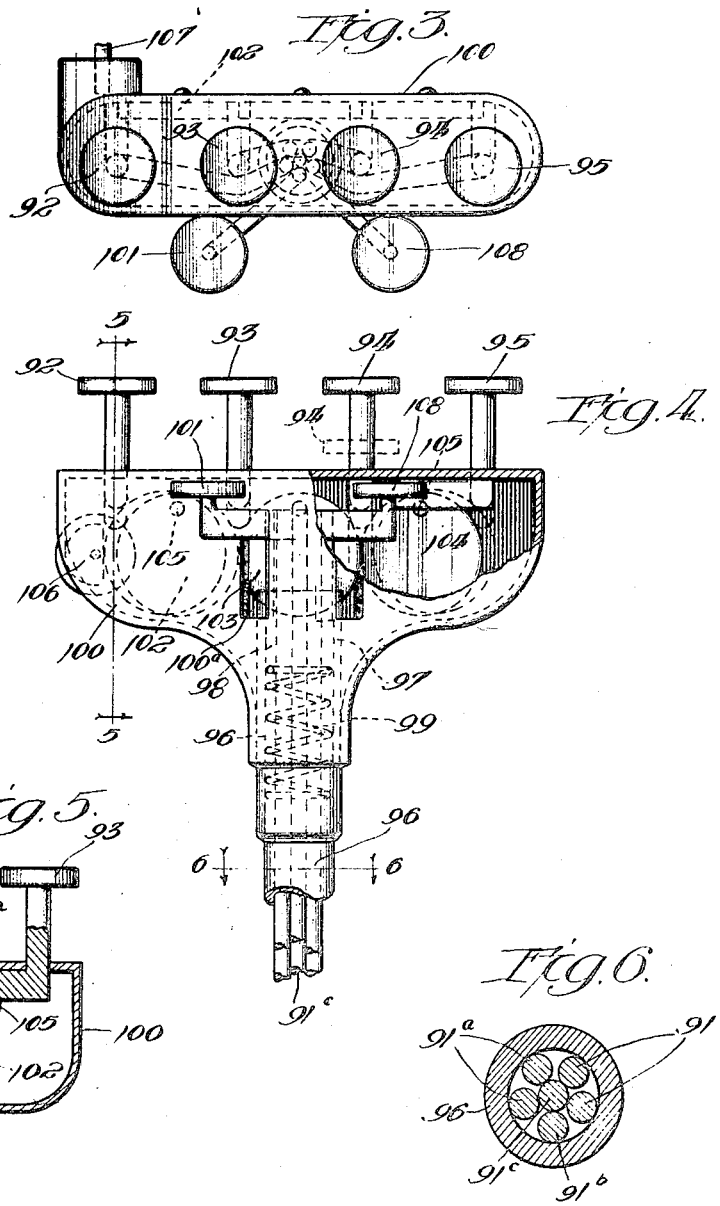

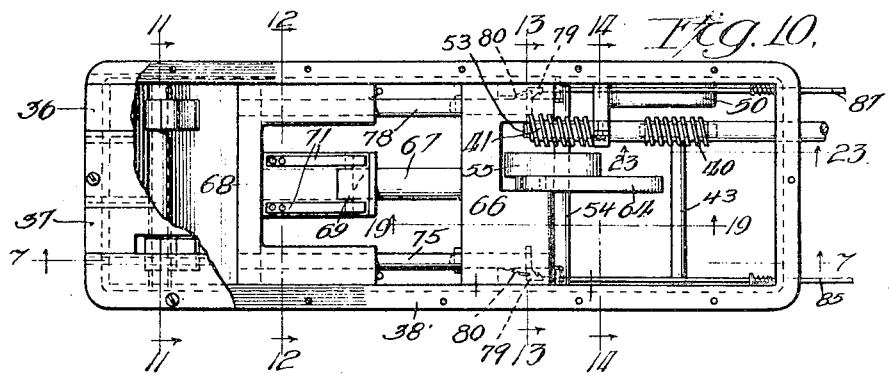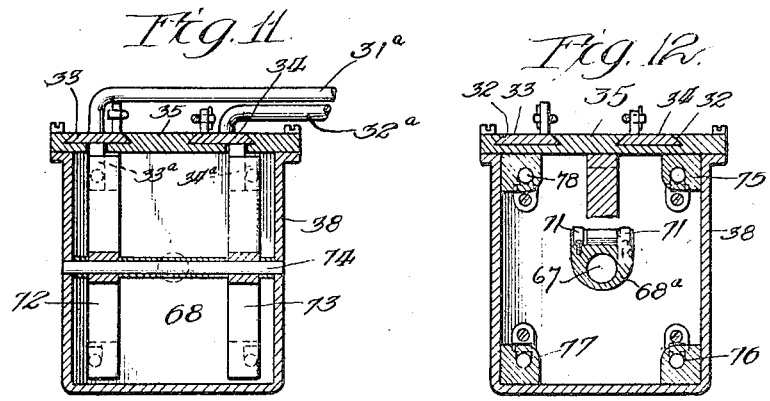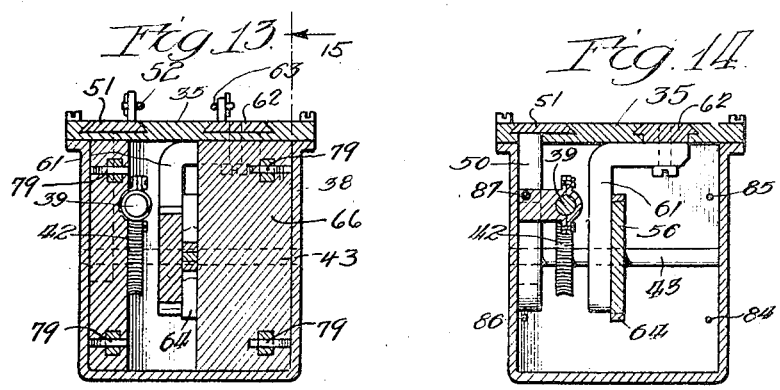

Aug. 14, 1923.
G. W. WOODWARD
AUTOMATIC CONTROL MECHANISM
Filed Jan. 20, 1920
1,464,962
10 Sheets-Sheet 6
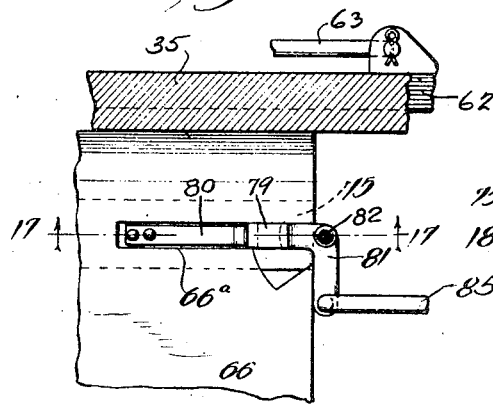
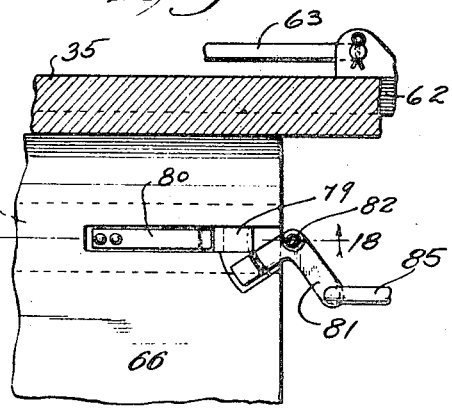
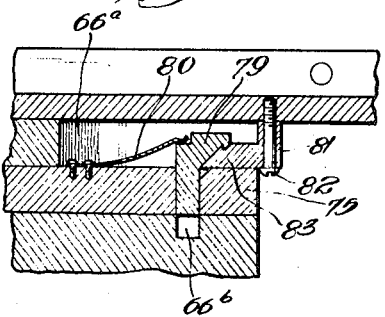
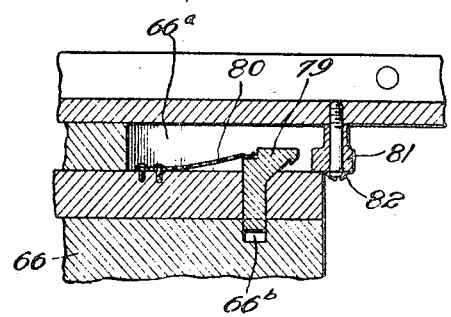
Witness:
Stephen T. Kelma
INVENTOR
Garrett W. Woodward
BY
ATTORNEY

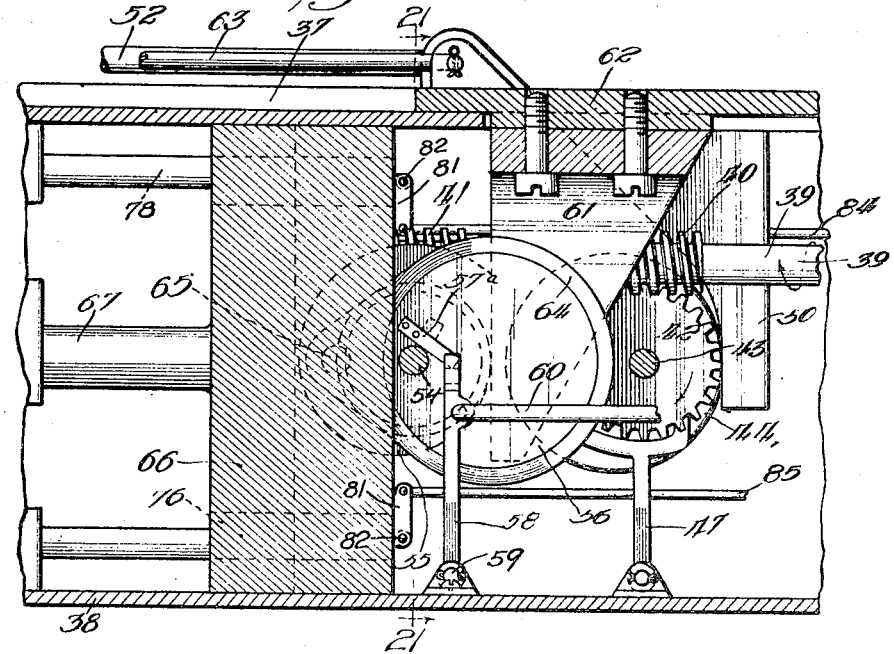
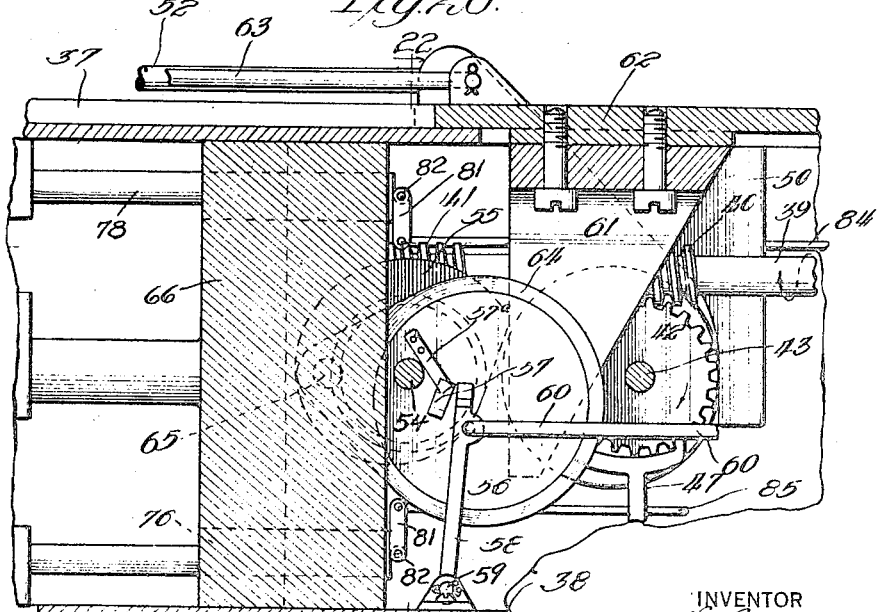

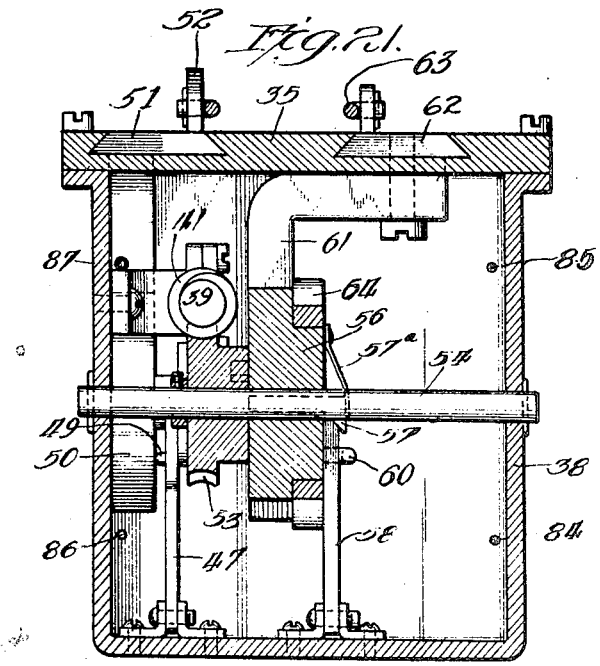
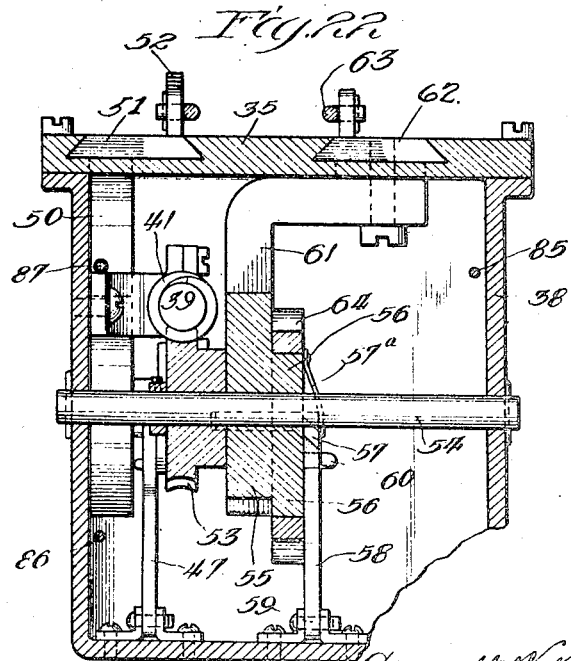

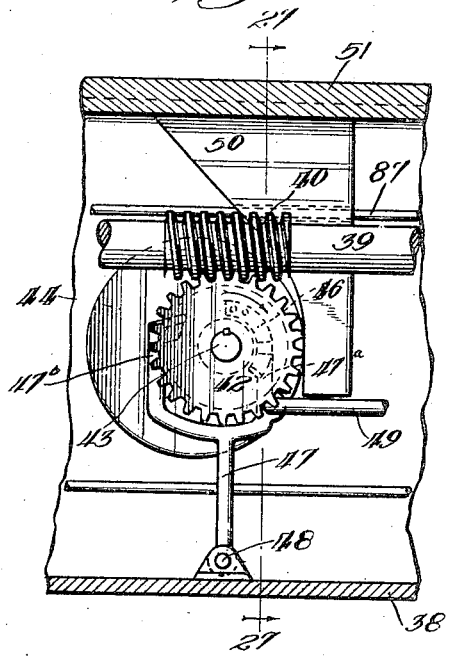

Aug. 14, 1923.

G. W. WOODWARD
AUTOMATIC CONTROL MECHANISM
Filed Jan. 20, 1920

1,464,962

10 Sheets-Sheet 10

Witness:
Stephen T. Kebora

INVENTOR
Garrett W. Woodward
BY
Dyrenforth, Lee, Chritton & Wiles
ATTORNEYS

Patented Aug. 14, 1923.

1,464,962

UNITED STATES PATENT OFFICE.

GARRETT W. WOODWARD, OF CHICAGO, ILLINOIS, ASSIGNOR, BY MESNE ASSIGNMENTS, TO WOODWARD AUTOMATIC CONTROL CORPORATION, OF CHICAGO, ILLINOIS, A CORPORATION OF ILLINOIS.

AUTOMATIC CONTROL MECHANISM.

Application filed January 20, 1920. Serial No. 352,648.

*To all whom it may concern:*

Be it known that I, GARRETT W. WOODWARD, a citizen of the United States, residing at Chicago, in the county of Cook and State of Illinois, have invented a new and useful Improvement in Automatic Control Mechanism, of which the following is a specification.

This invention relates to automatic control mechanism for automobiles and the like.

It is an object of this invention to provide means for utilizing power derived from the engine for making the gear shifts, setting and releasing the brake, disengaging the clutch, etc., all of course under the manual control of the operator.

Another object is to provide a form of gear shifting mechanism which is simple to operate and which will eliminate much of the levers and pedals now used in automobiles thereby greatly increasing the roominess and comfort of the front seat.

A further object is to provide means which can be connected to the ordinary forms of transmission and which will shift the gears of these transmissions noiselessly and without undue wear.

Figure 27:
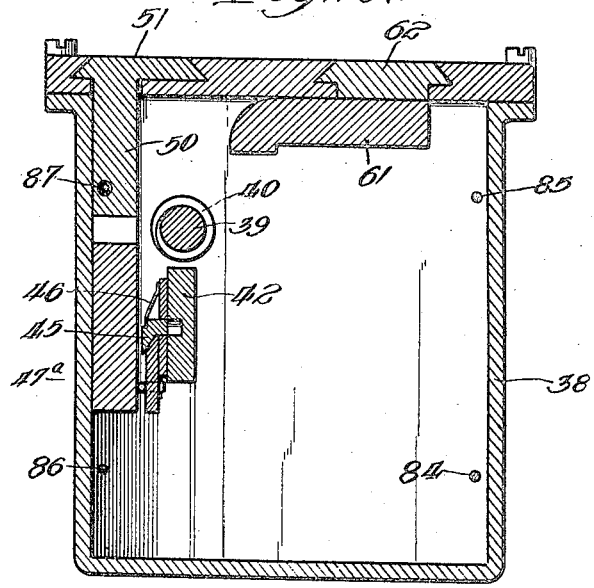
Figure 28:
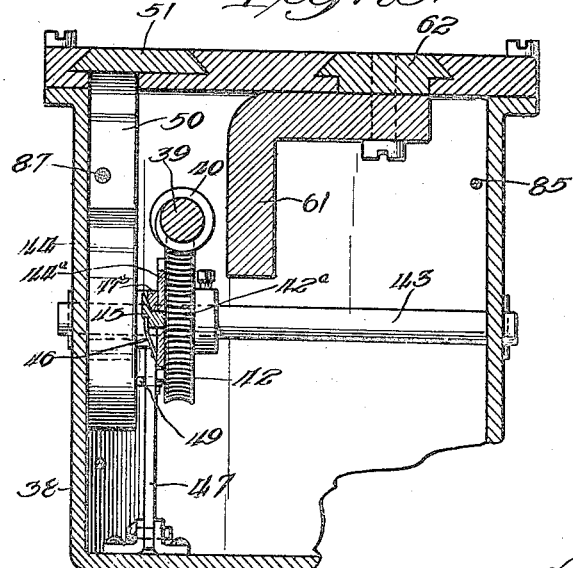

These and other objects as will appear in the specifications are accomplished by my invention which is fully described in the following specification and shown in the accompanying drawings in which, Figure 1 is a plan view of an automobile chassis equipped with a gear shifter embodying my invention; Fig. 1ª is an enlarged plan view of the transmission and gear shaft housings; Fig. 1ᵇ is an end elevation of the same; Fig. 2 is a partial perspective of the steering column showing the button block and operating wires; Fig. 3 is a top plan view of the button block; Fig. 4 is a side elevation of the same; Figs. 5 and 6 are sections on the lines 5—5 and 6—6 of Fig. 4; Figs. 7, 8 and 9 are vertical sections on the line 7—7 of Fig. 10 showing the shifting mechanism in various positions; Fig. 10 is a plan view of the cam case with the cover partly broken away; Figs. 11, 12, 13 and 14 are transverse sections on the lines 11—11, 12—12, 13—13 and 14—14 of Figs. 7 and 10; Figs. 15 and 16 are enlarged vertical partial sections on the line 15 of Fig. 13; Figs. 17 and 18 are enlarged vertical partial sections on the lines 17—17 and 18—18 of Figs. 15 and 16 respectively; Figs. 19 and 20 are enlarged partial vertical sections on the line 19—19 of Fig. 10; Figs. 21 and 22 are transverse sections on the lines 21—21 and 22—22 of Figs. 19 and 20 respectively; Figs. 23, 24, 25 and 26 are partial longitudinal sections on the line 23—23 of Fig. 10; and Figs. 27 and 28 are transverse sections on the lines 27—27 and 28—28 of Figs. 23 and 25 respectively.

I have illustrated an embodiment of my invention as applied to any ordinary form of automobile chassis having a transmission 30 equipped to give three forward speeds and a reverse such as is usually operated by a lever and is known as an H-type transmission. This transmission has two gear shifting rods 31 and 32 extending through the transmission housing and slidable longitudinally thereof. One of these rods which we will designate as 31 on its backward movement throws the gears into reverse and on its forward movement throws them into first or low speed. The other rod 32 likewise gives us second or intermediate speed and high speed on the backward and forward movements respectively. Both are in the mid position for neutral. The gear shifting mechanism which I will now describe takes the place of the usual gear shift lever.

The rods 31 and 32 are connected by means of the arms 31ª and 32ª to the slides 33 and 34 respectively as shown in Figs. 1ª, 1ᵇ, 7, 8 and 9. These slides are slidably mounted in longitudinal grooves 36 and 37 in the cover 35 of the control box 38 which is supported on the chassis beside the transmission and on substantially the same level.

A shaft 39 is connected at its forward end to the generator shaft or is connected in any other way so as to be continuously driven by the engine. The rear end of the shaft 39 is journalled in the forward end of the control box 38 and carries two worms 40 and 41. The former is meshed with the worm wheel 42 which is journalled on the shaft 43 which is journalled at its ends in the sides of the control box 38 as shown in Fig. 28.

The cam 44 is keyed on the shaft 43 and has a flanged extension 44ª which contacts the side of the worm wheel 42 and which has a hole through which extends a pin 45 which is pressed by a spring 46. One or more holes 42ᵃ in the worm wheel 42 are adapted to receive the end of the pin 45.

The pin 45 is controlled by means of a bifurcated lever 47 which is hingedly mounted at 48 on the bottom of the control box 38. This lever has two arms 47ᵃ and 47ᵇ, the former of which is adapted to normally engage the pin 45 and hold it in the retracted or disengaged position as shown in Figs. 23 and 27. The arm 47ᵇ is likewise adapted to engage the pin 45 at a point approximately 180° from the first position. The lever 47 is operated by a rod 49 from the driver's seat as will later be explained.

The cam 44 bears against a follower 50 which is carried by the slide 51 which is slidably mounted in the groove 36 in the cover 35. This slide is connected by means of the rod 52 with the brake operating mechanism as shown in Fig. 1.

The operation of the brake setting mechanism just described is as follows:—The parts are normally as shown in Figs. 23 and 27. When it is desired to set the brakes, the rod 49 is drawn to the right as shown in Fig. 24 by mechanism which will later be described. The bearing of the pin 45 on the arm 47ᵃ is at right angles to the movement of the latter and consequently little force is required to move it. When the arm 47ᵃ is drawn back as shown in Fig. 24 the pin 45 is forced down by the spring 46 engaging one of the holes 42ᵃ in the constantly revolving worm wheel 42 and the pin 45 and the cam 44 are carried around until the pin 45 strikes the arm 47ᵇ which raises the pin and disconnects it from the worm wheel 42 as shown in Fig. 25. The cam 44 has now turned approximately 180° from the position shown in Fig. 23 and has forced back the follower 50 the slide 51 and the rod 52 thereby setting the brakes, which will remain set so long as the arm 47 is held in the position shown in Fig. 25. Upon returning it however to the position shown in Fig. 26 the arm 47ᵇ will be disconnected from the pin 45 and it will again engage the worm wheel 42 and be carried around until it again engages the arm 47ᵃ as in Fig. 23. Figs. 24 and 26 show the mid positions when the pin and cam are being carried around by the worm wheel 42 just after the pin has been released from the positions shown in Figs. 23 and 24 respectively.

The worm 41 meshes with the worm wheel 53 which is loosely journalled on the shaft 54 which is journalled at its ends in the sides of the control box 38 as shown in Figs. 21 and 22. This shaft also carries a cam 55 and an eccentric 56 integral with the cam. A pin 57 is mounted in a hole in this integral member and has a spring 57ᵃ and an overhanging sloping edge similar to the pin 45. This overhanging edge is adapted to engage the stop 58 which is hingedly mounted at 59 on the floor of the control box 38. A rod 60 controls this stop in the same way as the rod 49 controls the arm 47. It will be noted however that there is only one stop in this case, hence the cam 55 and eccentric 56 must make a complete revolution at each withdrawal of the stop 58.

The cam follower 61 engages the face of the cam 55 and is carried by the slide 62 which is slidably mounted in the groove 37. It is connected to a rod 63 which is operatively connected to the engine clutch (not shown) so that when the follower is forced back by the cam as shown in Figs. 8 and 9, the clutch will be disengaged. It will be noted that the cam 55 has a very steep side which normally lies against the follower as shown in Fig. 7 so that for a small rotary movement of the cam the follower will move a relatively great amount. Having quickly disengaged the clutch, it is held "out" for the remainder of the half revolution as shown by the cam in Fig. 9. During this first half revolution as will latter be explained, the gear shift is accomplished and then the clutch is very gradually "let in" or engaged by the long gradual slope of the upper side of the cam 55 as shown in Fig. 9 which is operative during the last half of the revolution. No sudden "grabbing" of the clutch therefore can take place.

An eccentric strap 64, as shown in Figs. 7–9, surrounds the eccentric 56 and is hingedly pinned at 65 to the block 66 which is mounted to slide longitudinally in the control box 38 under the action of the eccentric 56. This block has a rod 67 extending rearwardly therefrom which enters a hole in the boss 68ᵃ of the block 68 which is also slidable in the control box 38. This boss has a transverse hole in which is slidably mounted a pin 69 having a sloping projection 69ᵃ adapted to be engaged by the toe of the projection 70 which is secured to the cover 35. The pin 69 is normally held down by the spring 71 as shown by Fig. 7 so that it prevents the rod 67 from entering the hole in the bars 68ᵃ. When however the block 68 is forced back to mid position by the rod 67, as shown in Fig. 8 the pin 69 is lifted against the action of the spring 71 by the projection 70, and the rod 67 slides into the hole in the boss 68ᵃ as shown in Fig. 9.

The slides 33 and 34 have depending lugs 33ᵃ and 34ᵃ as shown in Figs. 9 and 11 which engage the block 68 in its middle or neutral position and which are engaged on the reverse side by the upper ends of the rocker arms 72 and 73 which are pivotally mounted at their centers on the shaft 74 which is passed through holes in the sides of the box 38 as shown in Fig. 11, Four similar pins 75, 76, 77 and 78 are slidably mounted in the four corners of the blocks 66 and 68 as shown in Fig. 12. The pin 75 has a square section in the block 66 and a round end extending into the block 68. The block 66 is cut away at 66ᵃ as shown in Figs. 15–18 to permit of the pin 79 and its spring 80 being slid endwise into this block as it comes back into the position shown in Fig. 7. A rocker arm 81 is pivotally mounted on the side of the control box 38 by means of a screw 82. It carries a pawl 83 which is adapted to engage the beveled overhanging uppper portion of the pin 79 and hold it in a retracted position as shown in Fig. 17.

Fig. 18 shows the pawl turned to one side so as release the pin and permit the spring 80 to force the pin 79 into the hole 66ᵇ in the block 66. When locked in this position the rod 75 projects beyond the blocks 68 as shown by the pin 76 in Fig. 9, while the other pins 76, 77 and 78 are held back by pawls which are all similar to the pawl 83 in Fig. 17. These pawls are normally in the position shown in Figs. 15 and 17. The rocker arm 81 is connected to an operating rod 84 which is normally in the position shown in Fig. 15 but which may be drawn by the operator, as will later be explained into the position shown in Fig. 16 to release the pin 79 and thereby lock the pin 75 to the block 66. As will later be shown only one pawl can be released at a time so that only one rod as 76 in Fig. 9 can extend beyond the block 68 at any time.

Each of the pins 76, 77 and 78 has a rocker arm similar to the rocker arm 81 and they are connected to the operating rods 85, 86 and 87 respectively. Each of these rods as well as the operating rods 49 and 60 are extended forward as shown in Fig. 2 and are connected to individual bell cranks 88 which are pivotally mounted at 89 to a bracket 90 which is secured to the steering column 91. Each of the bell cranks to which are attached the rods 84, 85, 86 and 87 is connected by means of one of the stiff wires 91ᵃ with the buttons 92, 93, 94 and 95 respectively.

Referring now to Figs. 3, 4, 5 and 6 we see that these wires pass through the tube 96 which has secured on its upper end a larger tube 97. A section of tube 98 of substantially the same size as 96 is slidably mounted in the tube 97 and is pressed upwardly by the spring 99. The tube 98 is connected to the wire 91ᵇ which operates the rod 60 and controls the clutch. An arm 98ᵃ on this tube extends through an opening 100ᵃ in the box 100 and terminates in a button 101. This box is secured to the tube 97 and to the steering column 91.

The buttons 92, 93, 94 and 95 are each secured to one of the four wires 91ᵃ and over- lie the tube 97 so that when one of these buttons is pressed it automatically operates the clutch release button 101. Within this box 100 and midway between the buttons are three disks, 102, 103 and 104 which are hingedly mounted at their upper edges on pins 105 which are secured to the box 100. At one side is a round tumbler 106 which is flattened on one side which may be locked in the position shown in Fig. 4 or turned to 90° from that position by the key 107. In the position shown in Fig. 4 just enough space is given to permit the extensions as 93ᵃ of the button supports to pass between the flattened tumbler and the disk 102 which together with the disks 103 and 104 is swung to the dotted line position shown, the disk 104 striking the under side of the button support 95. When one of the buttons therefor is part way down no other button can be operated. By turning the tumbler 106 and removing the key the buttons 92, 93, 94 and 95 which control the gear shifting mechanism are locked against movement. This however leaves the button 101 which controls the clutch and the button 108 which controls the brake free to be operated at all times. The brake operating button is independent of all the others and is connected to the center wire 91ᶜ which operates the rod 49 to operate the brake as previously explained. As long as this button is held down the brake is set but with the engine running it will release as soon as the button is raised. It the engine stops with the brake on, it must be started before the brake is released.

The operation of the gear shifting mechanism is as follows:—The parts are in neutral positions in Fig. 7. The operator desires to shift from neutral to the first forward speed. We will assume that the button 93 corresponds to that speed. The operator presses this button which acts through the rod 85 to swing the rocker arm 81 to one side as shown in Fig. 16, thereby allowing the pin 79 to drop into the hole 66ᵇ in the block 66. This locks the rod 76 to the block while the other rods 75, 77 and 78 are disconnected from the block and held retracted by the rocker arms 81.

As previously explained, pressing down the button 93 also depresses the clutch button and the clutch rod 60 is drawn forward and the clutch quickly disengaged by the steep faced cam 55. At the same time the block 66 is moved rearwardly by the eccentric 56 which is connected to the cam 55. As the block 66 moves back to the position shown in Fig. 8 the rod 67 forces back the block 68 until the toe 70 lifts the detent 69 out of the way and the rod 67 enters the hole 68ᵃ in the block 68 as shown in Fig. 9. The rod 76 now protrudes through the block 68 and engages the lower end of the lever 73 forcing the upper end forward engaging the lug 34ª and moving the gear shifting rod 31 through the bar 31ª.

Thus the gear shift is accomplished while the clutch is held in a disengaged position as shown by the cam 55 in Fig. 9. The cam now slowly allows the follower 61 and the rod 63 to return to the normal position of Fig. 7 and the engine is then driving the car at low speed. The other gear shifts are accomplished in the same way, each button locking its corresponding rod 75, 76, 77 or 78 to the block 66 as the case may be, and this rod moving the bars 31ª or 32 backward or forward to move the transmission shifting rods.

To return to neutral from any speed it is necessary to press the neutral or clutch button 101.

Pedals are also preferably added to permit the operator to control the clutch and brake irrespective of the automatic mechanism.

While I have shown and described but a single embodiment of my invention, it is to be understood that it is capable of many modifications. Changes therefore in the construction and arrangement may be made without departing from the spirit and scope of the invention as disclosed in the apppended claims, in which it is my intention to claim all novelty inherent in my invention as broadly as possible in view of the prior art.

What I claim as new and desire to secure by Letters Patent is:—

1. In a gear shifting mechanism, a control box, a block reciprocable longitudinally thereof, a transmission having selective sliding gears, members on said control box for selectively moving said sliding gears, means movable longitudinally of said block and adapted to be selectively moved therewith for selectively moving said members to cause one of said gear trains to be thrown into operation.

2. In combination, a motor, a transmission for motor vehicle having selective sliding gears, two rods operatively connected to said gears and adapted to be alternately shifted from their neutral positions, a control box adjacent said transmission having members each of which is connected to one of said rods, a clutch between said motor and said transmission, a shaft in said control box driven by said motor and means under control of the operator for causing said shaft to selectively move said members to shift said gears and to automatically disengage said clutch while the gears are being shifted and to again engage the clutch after the gears are shifted.

3. In combination, a motor, a transmission for motor vehicle having selective sliding gears, two rods operatively connected to said gears and adapted to be alternately shifted from their neutral positions, a control box adjacent said transmission having members each of which is connected to one of said rods, a shaft in said control box continuously driven by said motor, a reciprocable block operable by said shaft, pins slidable in said block and control means for selectively locking said pins to said block for selectively moving said members for selectively shifting said gears.

4. In a gear shifting mechanism, a control box, a block reciprocable longitudinally thereof, a transmission having selective sliding gears, members on said control box for selectively moving said sliding gears, rods slidable in said block, mechanism for normally holding said rods in operative position and disconnected from said block and means for connecting said rods one at a time to said block to cause said members to be moved to selectively place said gears in mesh as said block is reciprocated.

5. In a motor driven vehicle, a motor, a selective sliding gear transmission operatively connected to the wheels of said vehicle, said transmission being of H-type and having two gear shifting elements extending thru the transmission housing said elements being slidable in parallel channels, slides connected to said elements and movable parallel to said channels, mechanism including members for selectively moving said slides to shift the gears of said transmission and a shaft continuously driven by the motor for operating said last named mechanism.

6. In a motor driven vehicle, a motor, a selective sliding gear transmission operatively connected to the wheels of said vehicle, said transmission being of H-type and having two gear shifting elements extending thru the transmission housing said elements being slidable in parallel channels, slides connected to said elements and movable parallel to said channels, mechanism including members for selectively moving said slides to shift the gears of said transmission, said mechanism returning all gears of the transmission to the neutral position at each actuation thereof before shifting them to the final position and a shaft continuously driven by the motor for operating said last-named mechanism.

GARRETT W. WOODWARD.